United States Patent
Zhang et al.

(10) Patent No.: US 9,425,611 B2
(45) Date of Patent: Aug. 23, 2016

(54) GATE DRIVING CIRCUIT AND ARRAY SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhengxin Zhang, Beijing (CN); Yi Zheng, Beijing (CN)

(73) Assignees: BOE TECHNOLOGY GROUP CO., LTD., Beijing (CN); BEIJING BOE OPTOELECTORNICS TECHNOLOGY CO., LTD., Beijing (CN)

( * ) Notice: Subject to any disclaimer, the term of this patent is extended or adjusted under 35 U.S.C. 154(b) by 168 days.

(21) Appl. No.: 14/361,535

(22) PCT Filed: Jul. 5, 2013

(86) PCT No.: PCT/CN2013/078902
§ 371 (c)(1),
(2) Date: May 29, 2014

(87) PCT Pub. No.: WO2014/173020
PCT Pub. Date: Oct. 30, 2014

(65) Prior Publication Data
US 2015/0009599 A1   Jan. 8, 2015

(30) Foreign Application Priority Data
Apr. 25, 2013   (CN) .......................... 2013 1 0147700

(51) Int. Cl.
*H03B 1/00*   (2006.01)
*H03K 3/00*   (2006.01)
(Continued)

(52) U.S. Cl.
CPC ............. *H02H 7/20* (2013.01); *G09G 3/3677* (2013.01); *H02H 1/0007* (2013.01); *H02H 3/28* (2013.01); *G09G 2310/0286* (2013.01); *G09G 2310/0291* (2013.01)

(58) Field of Classification Search
CPC . G09G 3/3648; G09G 3/3659; G09G 3/3688; G09G 3/3677
USPC ............ 327/108–112, 427, 434, 437; 326/82, 326/83; 345/92, 98, 100, 204, 211
See application file for complete search history.

(56) References Cited

U.S. PATENT DOCUMENTS 9,024,858 B2 *  5/2015  Koo ........................ G11C 19/28
                                                    345/100
2005/0174299 A1   8/2005  Park et al.
(Continued)

FOREIGN PATENT DOCUMENTS

CN   101226714 A   7/2008
CN   102144253 A   8/2011
(Continued)

OTHER PUBLICATIONS

Korean Office Action dated Mar. 20, 2015; Appln. No. 10-2014-7017471.
(Continued)

*Primary Examiner* — Lincoln Donovan
*Assistant Examiner* — Thomas Skibinski
(74) *Attorney, Agent, or Firm* — Ladas & Parry LLP

(57) ABSTRACT

Disclosed are a gate driving circuit and an array substrate relating to the field of display technique and capable of ensuring that, when there is a malfunction such as a short-circuit and the like among input paths of clock signals for a certain gate driving unit, other gate driving units can operate properly. The gate driving circuit includes a plurality of sets of gate driving units, each set of gate driving units includes m gate driving units, and m is an integer greater than 1; each set of gate driving units outputs a gate driving signal to a gate line; when one gate driving unit in a set of gate driving units malfunctions, said gate driving unit in malfunction is terminated in operation and other gate driving units in the set of gate driving units maintain an operation of the set of gate driving units.

14 Claims, 4 Drawing Sheets

(51) Int. Cl.
  *H02H 7/20* (2006.01)
  *G09G 3/36* (2006.01)
  *H02H 1/00* (2006.01)
  *H02H 3/28* (2006.01)

(56) References Cited

U.S. PATENT DOCUMENTS

| | | | |
|---|---|---|---|
| 2007/0159438 A1 | 7/2007 | Cho | |
| 2011/0148825 A1* | 6/2011 | Ueno | G09C 3/006 345/204 |
| 2012/0153996 A1* | 6/2012 | Su | G09C 3/3659 327/109 |
| 2012/0256817 A1* | 10/2012 | Chen | G11C 19/28 345/92 |
| 2014/0176410 A1* | 6/2014 | Ma | G09G 3/3622 345/92 |
| 2015/0185520 A1* | 7/2015 | Xu | G02F 1/13306 349/38 |

FOREIGN PATENT DOCUMENTS

| | | |
|---|---|---|
| KR | 20070070928 A | 7/2007 |
| KR | 1020070068798 A | 7/2007 |
| KR | 20050080411 A | 5/2014 |

OTHER PUBLICATIONS

International Search Report dated Jan. 22, 2014; PCT/CN2013/078902.
First Chinese Office Action dated Sep. 16, 2014; Appln. No. 201310147700.9.
International Preliminary Report on Patentability issued Oct. 27, 2015: PCT/CN2013/078902.

* cited by examiner

GATE DRIVING CIRCUIT AND ARRAY SUBSTRATE

TECHNICAL FIELD

The present disclosure relates to the field of display technique, and particularly to a gate driving circuit and an array substrate.

BACKGROUND

In recent years, high integration and low cost have become a trend for the development of a liquid crystal display. Herein, one important technique is a realization of a Gate Driver on Array (GOA) technique in mass production. A gate driving circuit is integrated into an array substrate of a liquid crystal display panel by utilizing the GOA technique, and thus an original gate driving integrated circuit can be omitted, thus reducing the cost of the production in terms of the material cost and the manufacturing process. The gate driving circuit which is integrated into the array substrate by means of the GOA technique is also referred to as a GOA circuit.

In the prior art, the GOA circuit comprises several GOA units, and each GOA unit receives a pair of clock signals which are inverted to each other and outputs a gate line signal for driving a corresponding gate line; in particular, an output terminal of each GOA unit is connected to one gate line. The inventor noted that since the GOA unit receives a pair of inverted clock signals simultaneously and input paths for the pair of inverted clock signals are generally close to each other and even overlap, a capacitance may be formed therebetween; further, a voltage difference between the pair of inverted clock signals can be high up to 20V, and such a high voltage difference can easily cause the capacitance formed between the input paths of the pair of inverted clock signals to be broken down, such that the input paths of the pair of inverted clock signals are short-circuited. As a result, the GOA unit having such a short-circuit operates abnormally, which may result in the failure of all the GOA units, and even the failure of the integrated circuits inside the liquid crystal display.

SUMMARY

In embodiments of the present disclosure, there are provided a gate driving circuit and an array substrate capable of ensuring that when a malfunction occurs, such as a short-circuit and the like, in the input paths of the clock signals for a certain gate driving unit, other gate driving units can operate properly.

Embodiments of the present disclosure adopt the following technical solution.

According to a first aspect of the embodiments of the present disclosure, there is provided a gate driving circuit comprising a plurality of sets of gate driving units, each set of gate driving units comprises m gate driving units, and m is an integer greater than 1; each set of gate driving units outputs a gate driving signal to a gate line; when one gate driving unit in a set of gate driving units malfunctions, said gate driving unit having a malfunction is terminated in operation and other gate driving units in the set of gate driving units maintain an operation of the set of gate driving units.

Optionally, m is an integer equal to or greater than 2 and less than or equal to 5.

Each of gate driving units comprises a gate driving module, a detection module and a control module, wherein the gate driving module comprises a first input port and a second input port, and the first input port of the gate driving module is connected to a first clock signal, the second input port of the gate driving module is connected to a second clock signal inverted to the first clock signal.

When the detection module detects that a short-circuit occurs between the first input port and the second input port of the gate driving module, the detection module sends a short-circuit signal to the control module; the control module, according to the short-circuit signal, disconnects a connection between the first input port of the gate driving module and the first clock signal as well as a connection between the second input port of the gate driving module and the second clock signal.

The detection module comprises a subtraction sub-module and an absolute value sub-module.

The subtraction sub-module has a first input port and a second input port, and the first input port of the subtraction sub-module is connected to the first input port of the gate driving module, and the second input port of the subtraction sub-module is connected to the second input port of the gate driving module, and the subtraction sub-module obtains a difference signal by performing a subtraction between an input signal at the first input port of the gate driving module and an input signal at the second input port of the gate driving module. An output terminal of the subtraction sub-module is connected to the absolute value sub-module and outputs the difference signal to the absolute value sub-module;

An output terminal of the absolute value sub-module is connected to the control module, and the absolute value sub-module obtains the absolute value of the received difference signal, and sends the short-circuit signal to the control module if the absolute value is less than a preset value.

The subtraction sub-module comprises: a first resistor, a second resistor, a third resistor, a fourth resistor and a first operational amplifier.

A first terminal of the first resistor is connected to the first input port of the subtraction sub-module, and a second terminal of the first resistor is connected to an inverting input terminal of the first operational amplifier; a first terminal of the second resistor is connected to the second input port of the subtraction sub-module, and a second terminal of the second resistor is connected to a non-inverting input terminal of the first operational amplifier; a first terminal of the third resistor is connected to the inverting input terminal of the first operational amplifier, and a second terminal of the third resistor is connected to an output terminal of the first operational amplifier; a first terminal of the fourth resistor is connected to the non-inverting input terminal of the first operational amplifier, and a second terminal of the fourth resistor is grounded.

The inverting input terminal of the first operational amplifier is connected to second terminal of the first resistor, the non-inverting input terminal of the first operational amplifier is connected the second terminal of the second resistor, and the output terminal of the first operational amplifier is connected to the output terminal of the subtraction sub-module.

Here, a resistance value of the first resistor and that of the second resistor are equal, and a resistance value of the third resistor and that of the fourth resistor are equal.

The absolute value sub-module comprises: a first diode, a fifth resistor, a sixth resistor and a second operational amplifier.

Here, an input terminal of the first diode is connected to the input terminal of the absolute value sub-module, and an output terminal of the first diode is connected to the output terminal of the absolute value sub-module; a first terminal of the fifth resistor is connected to the input terminal of the absolute value sub-module, and a second terminal of the fifth resistor is connected to an inverting input terminal of the second operational amplifier; a first terminal of the sixth resistor is connected to the inverting input terminal of the second operational amplifier, and a second terminal of the sixth resistor is connected to the output terminal of the absolute value sub-module.

The inverting input terminal of the second operational amplifier is connected to the second terminal of the fifth resistor, the non-inverting input terminal of the second operational amplifier is grounded, and an output terminal of the second operational amplifier is connected to the output terminal of the absolute value sub-module.

Here, a resistance value of the fifth resistor and that of the sixth resistor are equal.

The control module comprises a first switching transistor and a second switching transistor.

Here, a gate of the first switching transistor and that of the second switching transistor are connected to the output terminal of the absolute value sub-module; a first terminal of the first switching transistor is connected to the first clock signal, and a second terminal of the first switching transistor is connected to the first input port of the gate driving module; and a first terminal of the second switching transistor is connected to the second clock signal, and a second terminal of the second switching transistor is connected to the second input port of the gate driving module.

Optionally, the first switching transistor and the second switching transistor are thin film transistors.

According to a second aspect of the embodiments of the present disclosure, there is provided an array substrate comprising the above gate driving circuit.

In a technical solution of embodiments of the present disclosure, the gate driving circuit comprises a plurality of sets of gate driving units, wherein each set of gate driving units comprises m gate driving units, and m is an integer greater than 1; when one gate driving unit in a set of gate driving units malfunctions, said gate driving unit in malfunction is terminated in operation. After the gate driving unit in malfunction is terminated in operation, since each set of gate driving units comprises at least two gate driving units and respective gate driving units output a gate driving signal to one gate line, the normal operation of the gate line is guaranteed to a large extent, thus improving reliability of the gate driving circuit in operation and enhancing user's experience in use.

BRIEF DESCRIPTION OF THE DRAWINGS

In order to more clearly describe the technical solutions in the embodiments of the present disclosure or in the prior art, drawings necessary for describing the embodiments of the present disclosure or the prior art are simply introduced as follows. It should be obvious for those skilled in the art that the drawings described as follows only illustrate some embodiments of the present disclosure and other drawings can be obtained based on these drawings without paying any inventive efforts.

DETAILED DESCRIPTION

To illustrate the technical solutions of the embodiments of the present disclosure clearly and fully, hereinafter, detailed descriptions will be made to the embodiments of the present disclosure in connection with the accompanying drawings. Obviously, the embodiments as described are only a part of the embodiments of the present disclosure, and are not all the embodiments of the present disclosure. All other embodiments which are obtained by those skilled in the art based on the embodiments of the present disclosure without paying any inventive labor shall fall into the protection of the present disclosure.

Figure 1:
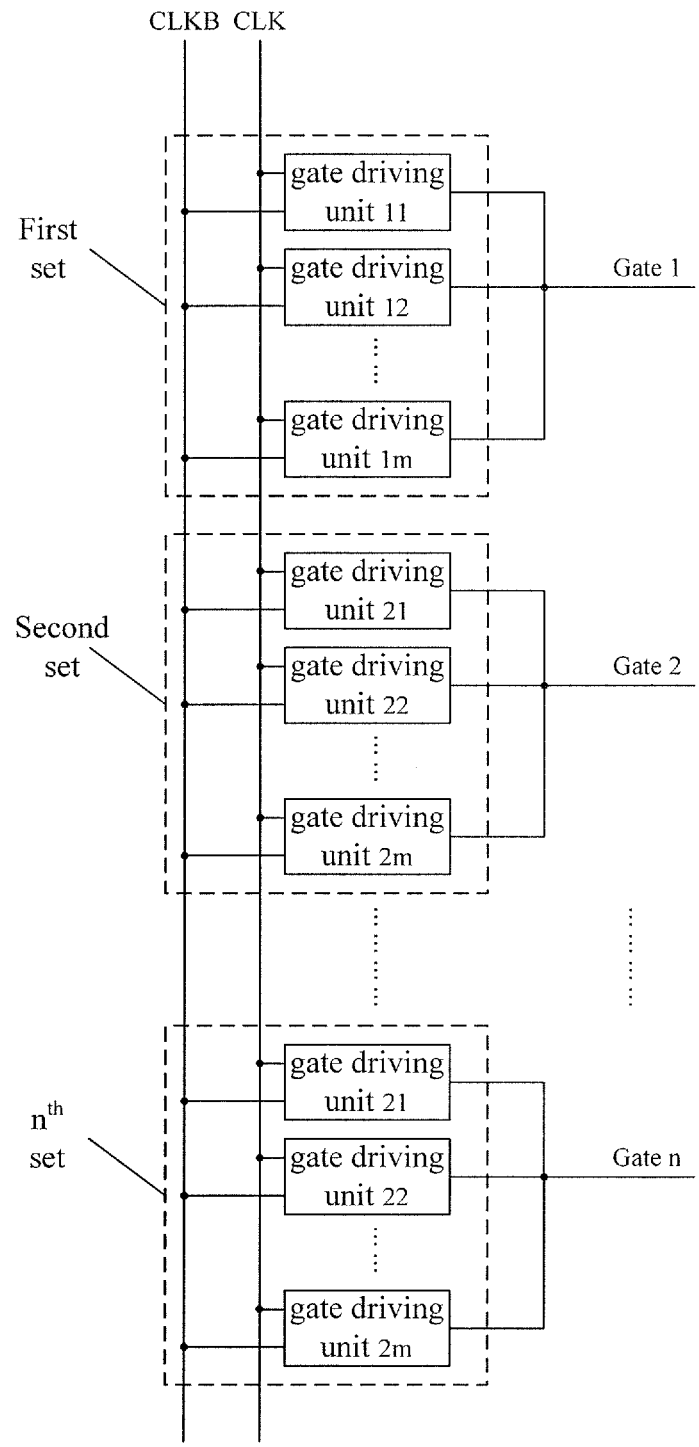
FIG. 1 is a schematic diagram illustrating a structure of a gate driving circuit according to an embodiment of the present disclosure.

According to the embodiments of the present disclosure, there is provided a gate driving circuit, as shown in FIG. 1. The gate driving circuit comprises a plurality of sets of gate driving units, each set of gate driving units comprises m gate driving units, and m is an integer greater than 1. The number of the plurality of sets of gate driving units corresponds to the number of the gate lines. Each set of gate driving units outputs a gate driving signal to one gate line; when one gate driving unit in a set of gate driving units malfunctions, said gate driving unit is terminated in operation and other gate driving units in the set of gate driving units maintain the operation of the set of gate driving units.

Optionally, m is an integer equal to or greater than 2 and less than or equal to 5. When m is less than 2, the functions as described in the embodiments of the present disclosure cannot be achieved. When m is greater than 5, although the functions of the embodiments of the present disclosure can be achieved, the complexity of manufacturing processes and wiring structure is increased significantly.

It can be seen from FIG. 1 and the above description that the gate driving signal received by any one of the gate lines is supplied by respective gate driving units in a corresponding set of gate driving units together, and when any one of gate driving units in a set of gate driving units is terminated in operation due to malfunction, other gate driving units in the same set of gate driving units are still capable of operating properly. In addition, it is a very low probability that all the gate driving units in a same set of gate driving units have a malfunction such as a short-circuit and the like simultaneously, and the gate line can receive a normal gate driving signal continuously, thus improving the operational reliability of the gate driving circuit and enhancing the user's experience in use.

In the technical solution of the embodiments of the present disclosure, the gate driving circuit comprises a plurality of sets of gate driving units, wherein each set of gate driving units comprise m gate driving units, and m is an integer greater than 1; when one gate driving unit in a set of gate driving units malfunctions, said gate driving unit in malfunction is terminated in operation. After the gate driving unit in malfunction is terminated in operation, since each set of gate driving units comprises at least two gate driving units and respective gate driving units output a gate driving signal to a same gate line, the normal operation of the gate line is guaranteed to a large extent, thus improving the reliability of the gate driving circuit in operation and enhancing the user's experience in use.

Figure 2:
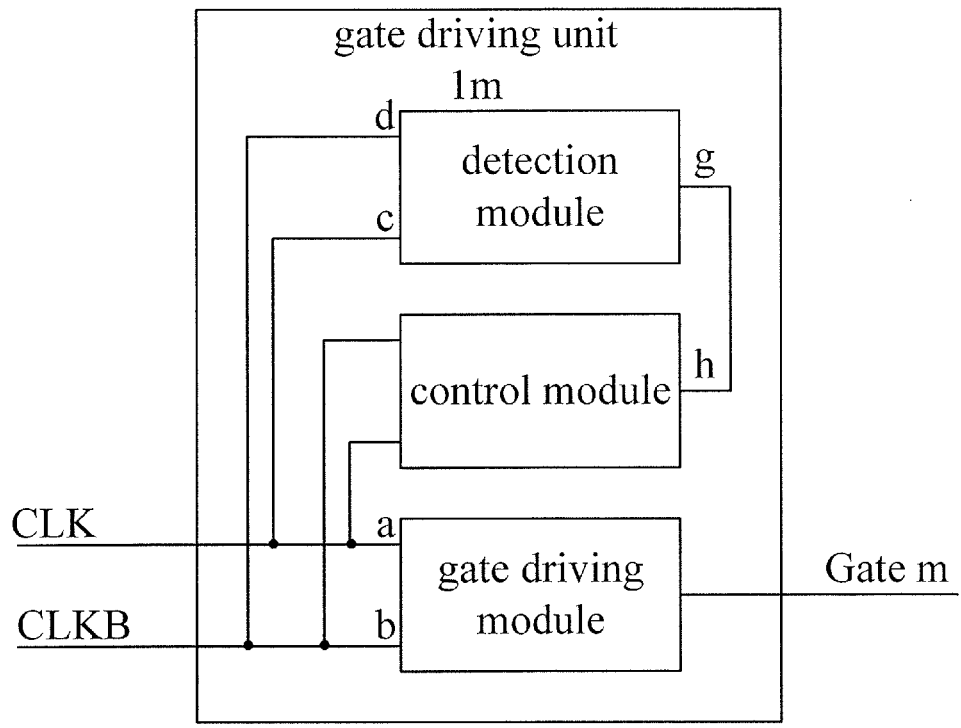
FIG. 2 is a first schematic diagram illustrating a structure of a gate driving unit 1m according to an embodiment of the present disclosure.

In particular, since respective gate driving units are identical in structure, a gate driving unit 1m in a first set of gate driving units in FIG. 1 is taken as an example for illustration. As shown in FIG. 2, the gate driving unit 1m comprises a gate driving module, a detection module and a control module. Here, the gate driving module comprise a first input port a and a second input port b, and the first input port a of the gate driving module is connected to a first clock signal CLK, the second input port b of the gate driving module is connected to a second clock signal CLKB inverted to the first clock signal CLK. The detection module is configured to detect whether a short-circuit occurs between the first input port a and the second input port b of the gate driving module. The control module is configured to control signals inputted to the gate driving module. In particular, when the detection module detects that a short-circuit occurs between the first input port a and the second input port b of the gate driving module, the detection module sends a short-circuit signal to the control module; the control module, according to the short-circuit signal, disconnects a connection between the first input port a of the gate driving module and the first clock signal CLK as well as a connection between the second input port b of the gate driving module and the second clock signal CLKB.

Figure 3:
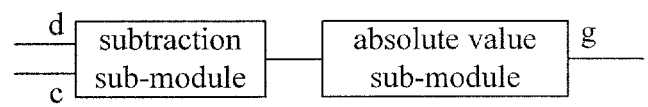
FIG. 3 is a schematic diagram illustrating a structure of a detection module according to an embodiment of the present disclosure.

Further, in the technical solutions of the embodiment of the present disclosure, as shown in FIG. 3, the detection module particularly comprises a subtraction sub-module and an absolute value sub-module.

In particular, the subtraction sub-module has a first input port c (the first input port c of the detection module) and a second input port d (the second input port d of the detection module), and in connection with FIG. 2, it can be seen that the first input port c of the subtraction sub-module is connected to the first input port a of the gate driving module, and the second input port d of the subtraction sub-module is connected to the second input port b of the gate driving module, and the subtraction sub-module obtains a difference signal by performing a subtraction between an input signal at the first input port a of the gate driving module and an input signal at the second input port b of the gate driving module; an output terminal of the subtraction sub-module is connected to the absolute value sub-module and outputs the difference signal to the absolute value sub-module.

An output terminal of the absolute value sub-module (i.e., an output terminal g of the detection module in FIG. 2) is connected to the control module, and the absolute value sub-module obtains the absolute value of the received difference signal, and sends the short-circuit signal to the control module if the absolute value is less than a preset value.

Figure 4:
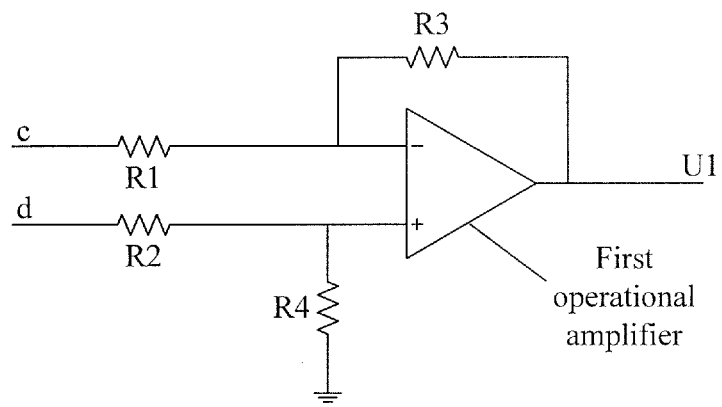
FIG. 4 is a schematic diagram illustrating a structure of a subtraction sub-module according to an embodiment of the present disclosure.

Further, in the embodiments of the present disclosure, as shown in FIG. 4, the subtraction sub-module comprises: a first resistor R1, a second resistor R2, a third resistor R3, a fourth resistor R4 and a first operational amplifier.

A first terminal of the first resistor R1 is connected to the first input port c of the subtraction sub-module, and a second terminal of the first resistor R1 is connected to an inverting input terminal of the first operational amplifier. A first terminal of the second resistor R2 is connected to the second input port d of the subtraction sub-module, and a second terminal of the second resistor R2 is connected to a non-inverting input terminal of the first operational amplifier. A first terminal of the third resistor R3 is connected to the inverting input terminal of the first operational amplifier, and a second terminal of the third resistor R3 is connected to an output terminal of the first operational amplifier. A first terminal of the fourth resistor R4 is connected to the non-inverting input terminal of the first operational amplifier, and a second terminal of the fourth resistor R4 is grounded.

Here, a resistance value of the first resistor R1 and that of the second resistor R2 are equal, and a resistance value of the third resistor R3 and that of the fourth resistor R4 are equal.

Since R1=R2 and R3=R4, it can be known from FIG. 4 that the difference signal U1 outputted from the subtraction sub-module is as follows:

$$U_1 = \frac{R_3 \times (CLKB - CLK)}{R_1}$$

Figure 5:
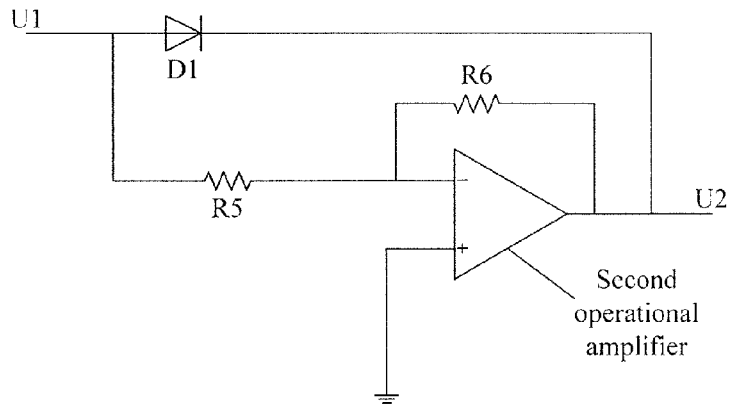
FIG. 5 is a schematic diagram illustrating a structure of an absolute value sub-module according to an embodiment of the present disclosure.

At the same time, as shown in FIG. 5, the absolute value sub-module comprises: a first diode D1, a fifth resistor R5, a sixth resistor R6 and a second operational amplifier.

An input terminal of the first diode D1 is connected to the input terminal of the absolute value sub-module, and an output terminal of the first diode D1 is connected to the output terminal g of the absolute value sub-module. A first terminal of the fifth resistor R5 is connected to the input terminal of the absolute value sub-module, and a second terminal of the fifth resistor R5 is connected to an inverting input terminal of the second operational amplifier. A first terminal of the sixth resistor R6 is connected to the inverting input terminal of the second operational amplifier, and a second terminal of the sixth resistor R6 is connected to the output terminal of the absolute value sub-module. The inverting input terminal of the second operational amplifier is connected to the second terminal of the fifth resistor R5, a non-inverting input terminal of the second operational amplifier is grounded, and an output terminal of the second operational amplifier is connected to the output terminal g of the absolute value sub-module.

Here, the resistance value of the fifth resistor R5 and that of the sixth resistor R6 are equal.

In connection with FIG. 5, it can be known that the difference signal U1 outputted from the subtraction sub-module is processed by the absolute value sub-module as follows:
when U1>0, D1 is turned on, and U2=U1;
when U1<0, D1 is turned off, and after U1 passes through the second operational amplifier, since R5=R6.

$$U_2 = -\frac{R_6 \times U_1}{R_5} = -U_1$$

Figure 6:
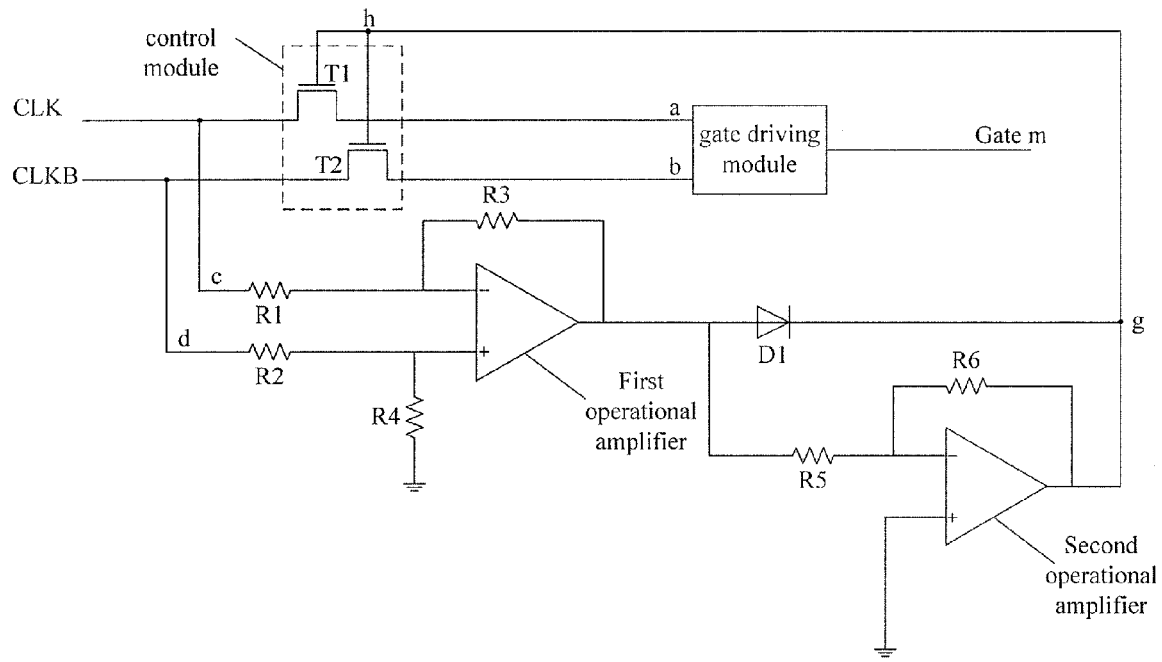
FIG. 6 is a second schematic diagram illustrating a structure of a gate driving unit 1m according to an embodiment of the present disclosure.

After that, as shown in FIG. 6, the absolute value sub-module sends the U2 to the control module via the output terminal g.

Further, in the embodiments of the present disclosure, as shown in FIG. 6, the control module comprises a first switching transistor T1 and a second switching transistor T2.

A gate of the first switching transistor T1 and that of the second switching transistor T2 are connected to the output terminal g of the absolute value sub-module. A first terminal of the first switching transistor T1 is connected to the first clock signal CLK, and a second terminal of the first switching transistor T1 is connected to the first input port a of the gate driving module. A first terminal of the second switching transistor T2 is connected to the second clock signal CLKB, and a second terminal of the second switching transistor T2 is connected to the second input port b of the gate driving module.

Figure 7:
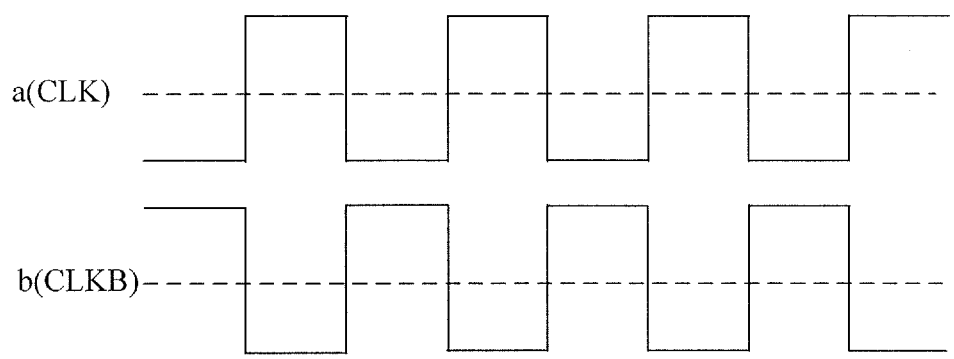
FIG. 7 is a schematic diagram showing signals received at a first input port a and a second input port b of the gate driving module before a short-circuit occurs according to an embodiment of the present disclosure.

As shown in FIG. 7, in a case that there is no short-circuit between the first input port a and the second input port b of the gate driving module, the signal receive at the first input port a is the first clock signal CLK, and the signal receive at the second input port b is the second clock signal CLKB. Since the high level voltages of the first clock signal CLK and the second clock signal CLKB are about 12V~15V and the low level voltages thereof are about −8V~−12V, the voltage difference between the first clock signal CLK and the second clock signal CLKB is always more than 20V. It can be known from the above analysis that $$U_1 = \frac{R_3 \times (CLKB - CLK)}{R_1},$$

when U1>0, U2=U1; and when U1<0, U2=−U1; the voltage value of U2 at this time can maintain the first switching transistor T1 and the second switching transistor T2 in the control module to be in on-state, and the gate driving module can receive the first clock signal CLK and the second clock signal CLKB, and thus can operate properly.

Figure 8:
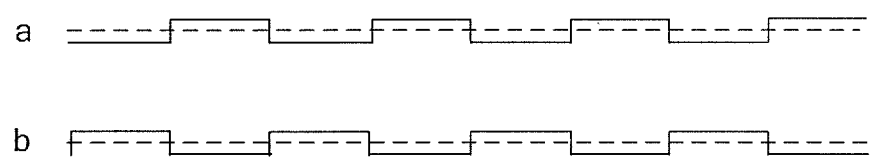
FIG. 8 is a schematic diagram showing signals received at the first input port a and a second input port b of the gate driving module after the short-circuit occurs according to an embodiment of the present disclosure.

In a case that there is a short-circuit between the first input port a and the second input port b of the gate driving unit, as shown in FIG. 8, the first input port a receives the first clock signal CLK and the second clock signal CLKB simultaneously, the level of the signal as received is very low, approximating to zero. Similarly, the level of the signal received at the second input port b is also very low. Thus, the difference between the signal level received at the first input port a and that received at the second input port h is too low to maintain the first switching transistor T1 and the second switching transistor T2 in the control module to be in on-state, and the first switching transistor T1 and the second switching transistor T2 in the control module are turned off. As a result, the gate driving unit is disconnected from the first clock signal CLK and the second clock signal CLKB, thus ensuring that other gate driving units are not affected by the gate driving unit having a short-circuit, and ensuring that the gate driving circuit can operate properly.

Optionally, the first switching transistor T1 and the second switching transistor T2 are thin film transistors.

Optionally, in the embodiments of the present disclosure, the first switching transistor T1 and the second switching transistor T2 are N-type thin film transistors.

It should be noted that in the embodiments of the present disclosure, although only one pair of clock signals CLK and CLKB is described for facilitating the illustration, the present invention can also be applied to the gate driving circuit with a plurality of pairs of clock signals; since the implementation thereof is similar to the above-mentioned, and the details are omitted.

According to the embodiments of the present disclosure, there is further provided an array substrate comprising the above gate driving circuit.

It will be obvious that those skilled in the art may make modifications and variations to the above embodiments without departing from the spirit and scope of the present disclosure. Such modifications and variations are intended to be included within the spirit and scope of the present disclosure provided that the modifications and variations belong to the scope of the claims of the present disclosure and the equivalence thereof.

What is claimed is:

1. A gate driving circuit comprising a plurality of sets of gate driving units, wherein
   each set of gate driving units comprises m gate driving units, and m is an integer greater than 1;
   each set of gate driving units is configured to output a gate driving signal to a gate line;
   when one gate driving unit in a set of gate driving units malfunctions, said gate driving unit is configured to be terminated in operation and other gate driving units in the set of gate driving units are configured to maintain an operation of the set of gate driving units,
   wherein each of gate driving units comprises a gate driving module, a detection module and a control module, wherein
   the gate driving module comprise a first input port and a second input port, the first input port of the gate driving module is connected to a first clock signal, and the second input port of the gate driving module is connected to a second clock signal inverted to the first clock signal;
   when the detection module detects that there is a short-circuit between the first input port of the gate driving module and the second input port of the gate driving module, the detection module is configured to send a short-circuit signal to the control module; the control module is configured to disconnect a connection between the first input port of the gate driving module and the first clock signal as well as a connection between the second input port of the gate driving module and the second clock signal according to the short-circuit signal.

2. The gate driving circuit according to claim 1, wherein m is an integer equal to or greater than 2 and less than or equal to 5.

3. The gate driving circuit according to claim 1, wherein the detection module comprises a subtraction sub-module and an absolute value sub-module; wherein
   the subtraction sub-module has a first input port and a second input port, the first input port of the subtraction sub-module is connected to the first input port of the gate driving module, and the second input port of the subtraction sub-module is connected to the second input port of the gate driving module, and the subtraction sub-module is configured to obtain a difference signal by performing a subtraction between an input signal at the first input port of the gate driving module and an input signal at the second input port of the gate driving module; an output terminal of the subtraction sub-module is connected to the absolute value sub-module and is configured to output the difference signal to the absolute value sub-module;
   an output terminal of the absolute value sub-module is connected to the control module, and the absolute value sub-module is configured to obtain an absolute value of the received difference signal and send the short-circuit signal to the control module if the absolute value is less than a preset value.

4. The gate driving circuit according to claim 3, wherein the subtraction sub-module comprises: a first resistor, a second resistor, a third resistor, a fourth resistor and a first operational amplifier; wherein
   a first terminal of the first resistor is connected to the first input port of the subtraction sub-module, and a second terminal of the first resistor is connected to an inverting input terminal of the first operational amplifier;
   a first terminal of the second resistor is connected to the second input port of the subtraction sub-module, and a second terminal of the second resistor is connected to a non-inverting input terminal of the first operational amplifier;

a first terminal of the third resistor is connected to the inverting input terminal of the first operational amplifier, and a second terminal of the third resistor is connected to an output terminal of the first operational amplifier;

a first terminal of the fourth resistor is connected to the non-inverting input terminal of the first operational amplifier, and a second terminal of the fourth resistor is grounded; and the output terminal of the first operational amplifier is connected to the output terminal of the subtraction sub-module;

wherein a resistance value of the first resistor and that of the second resistor are equal, and a resistance value of the third resistor and that of the fourth resistor are equal.

5. The gate driving circuit according to claim 4, wherein the absolute value sub-module comprises: a first diode, a fifth resistor, a sixth resistor and a second operational amplifier; wherein an input terminal of the first diode is connected to the input terminal of the absolute value sub-module, and an output terminal of the first diode is connected to the output terminal of the absolute value sub-module;

a first terminal of the fifth resistor is connected to the input terminal of the absolute value sub-module, and a second terminal of the fifth resistor is connected to an inverting input terminal of the second operational amplifier;

a first terminal of the sixth resistor is connected to the inverting input terminal of the second operational amplifier, and a second terminal of the sixth resistor is connected to the output terminal of the absolute value sub-module; and a non-inverting input terminal of the second operational amplifier is grounded, and an output terminal of the second operational amplifier is connected to the output terminal of the absolute value sub-module;

wherein a resistance value of the fifth resistor and that of the sixth resistor are equal.

6. The gate driving circuit according to claim 5, wherein the control module comprises a first switching transistor and a second switching transistor; wherein a gate of the first switching transistor and that of the second switching transistor are connected to the output terminal of the absolute value sub-module;

a first terminal of the first switching transistor is connected to the first clock signal, and a second terminal of the first switching transistor is connected to the first input port of the gate driving module; and a first terminal of the second switching transistor is connected to the second clock signal, and a second terminal of the second switching transistor is connected to the second input port of the gate driving module.

7. The gate driving circuit according to claim 6, wherein the first switching transistor and the second switching transistor are thin film transistors.

8. The gate driving circuit according to claim 6, wherein the first switching transistor and the second switching transistor are N-type thin film transistors.

9. An array substrate comprising the gate driving circuit according to claim 1.

10. The array substrate according to claim 9, wherein the detection module comprises a subtraction sub-module and an absolute value sub-module; wherein the subtraction sub-module has a first input port and a second input port, the first input port of the subtraction sub-module is connected to the first input port of the gate driving module, and the second input port of the subtraction sub-module is connected to the second input port of the gate driving module, and the subtraction sub-module is configured to obtain a difference signal by performing a subtraction between an input signal at the first input port of the gate driving module and an input signal at the second input port of the gate driving module; an output terminal of the subtraction sub-module is connected to the absolute value sub-module and is configured to output the difference signal to the absolute value sub-module;

an output terminal of the absolute value sub-module is connected to the control module, and the absolute value sub-module is configured to obtain an absolute value of the received difference signal and send the short-circuit signal to the control module if the absolute value is less than a preset value.

11. The array substrate according to claim 10, wherein the subtraction sub-module comprises: a first resistor, a second resistor, a third resistor, a fourth resistor and a first operational amplifier; wherein a first terminal of the first resistor is connected to the first input port of the subtraction sub-module, and a second terminal of the first resistor is connected to an inverting input terminal of the first operational amplifier;

a first terminal of the second resistor is connected to the second input port of the subtraction sub-module, and a second terminal of the second resistor is connected to a non-inverting input terminal of the first operational amplifier;

a first terminal of the third resistor is connected to the inverting input terminal of the first operational amplifier, and a second terminal of the third resistor is connected to an output terminal of the first operational amplifier;

a first terminal of the fourth resistor is connected to the non-inverting input terminal of the first operational amplifier, and a second terminal of the fourth resistor is grounded; and the output terminal of the first operational amplifier is connected to the output terminal of the subtraction sub-module;

wherein a resistance value of the first resistor and that of the second resistor are equal, and a resistance value of the third resistor and that of the fourth resistor are equal.

12. The array substrate according to claim 11, wherein the absolute value sub-module comprises: a first diode, a fifth resistor, a sixth resistor and a second operational amplifier; wherein an input terminal of the first diode is connected to the input terminal of the absolute value sub-module, and an output terminal of the first diode is connected to the output terminal of the absolute value sub-module;

a first terminal of the fifth resistor is connected to the input terminal of the absolute value sub-module, and a second terminal of the fifth resistor is connected to an inverting input terminal of the second operational amplifier;

a first terminal of the sixth resistor is connected to the inverting input terminal of the second operational amplifier, and a second terminal of the sixth resistor is connected to the output terminal of the absolute value sub-module; and a non-inverting input terminal of the second operational amplifier is grounded, and an output terminal of the second operational amplifier is connected to the output terminal of the absolute value sub-module;

wherein a resistance value of the fifth resistor and that of the sixth resistor are equal.

13. The array substrate according to claim 12, wherein the control module comprises a first switching transistor and a second switching transistor; wherein a gate of the first switching transistor and that of the second switching transistor are connected to the output terminal of the absolute value sub-module;

a first terminal of the first switching transistor is connected to the first clock signal, and a second terminal of the first switching transistor is connected to the first input port of the gate driving module; and a first terminal of the second switching transistor is connected to the second clock signal, and a second terminal of the second switching transistor is connected to the second input port of the gate driving module.

14. The array substrate according to claim 13, wherein the first switching transistor and the second switching transistor are thin film transistors.

* * * * *